US008677748B2

(12) United States Patent
Brahma et al.

(10) Patent No.: US 8,677,748 B2
(45) Date of Patent: Mar. 25, 2014

(54) FRESH AIR FLOW ESTIMATION

(75) Inventors: Indranil Brahma, Bloomington, IN (US); Ashwin Vyas, Columbus, IN (US); Vivek Anand Sujan, Columbus, IN (US); Phanindra Garimella, Bloomington, IN (US); John N. Chi, Columbus, IN (US); Abdoul Karim Abdoul Azizou, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 217 days.

(21) Appl. No.: 13/153,132

(22) Filed: Jun. 3, 2011
(Under 37 CFR 1.47)

(65) Prior Publication Data

US 2012/0137678 A1 Jun. 7, 2012

Related U.S. Application Data

(60) Provisional application No. 61/351,005, filed on Jun. 3, 2010.

(51) Int. Cl.
| F02D 23/00 | (2006.01) |
| F02B 33/44 | (2006.01) |
| F02B 37/12 | (2006.01) |
| G01M 15/00 | (2006.01) |
| G01F 1/00 | (2006.01) |
| G01F 1/12 | (2006.01) |
| G06F 19/00 | (2011.01) |

(52) U.S. Cl.
USPC ............ 60/605.1; 60/611; 701/102; 702/100; 702/45; 73/118.02; 73/114.77; 73/114.74

(58) Field of Classification Search
USPC .............. 60/605.1, 605.2, 611; 701/102, 103, 701/104, 108, 110; 123/559.1, 445, 568.12; 73/114.77, 114.74, 118.2, 786.48, 73/118.02; 702/100, 45
See application file for complete search history.

(56) References Cited

U.S. PATENT DOCUMENTS

| 3,603,079 | A | 9/1971 | Kickbusch |
| 4,423,594 | A | 1/1984 | Ellis |

(Continued)

FOREIGN PATENT DOCUMENTS

JP 2006329138 A * 12/2006 ............. F02D 45/00

OTHER PUBLICATIONS

International Preliminary Report on Patentability and Written Opinion, International Application No. PCT/US2011/039152, Dec. 13, 2012, 6 pages.

(Continued)

Primary Examiner — Thai Ba Trieu
(74) Attorney, Agent, or Firm — Krieg DeVault LLP

(57) ABSTRACT

An apparatus includes an operating conditions module that interprets a number of compressor operating parameters; a compressor flow module that determines a compressor inlet flow in response to the number of compressor operating parameters; and a fresh air flow module that provides a fresh air flow value in response to the compressor inlet flow. The operating conditions module further interprets a current mass air flow value, and the apparatus further includes a mass air flow sensor trimming module that adjusts a mass air flow sensor drift value in response to the current mass air flow value and the fresh air flow value. The apparatus includes a diagnostics module that determines a mass air flow sensor is failed in response to the current mass air flow value and the fresh air flow value.

34 Claims, 3 Drawing Sheets

(56) References Cited

U.S. PATENT DOCUMENTS

| | | | |
|---|---|---|---|
| 5,526,266 A * | 6/1996 | Rutan et al. | 60/605.1 |
| 5,546,795 A * | 8/1996 | Yamagishi | 73/114.33 |
| 5,563,353 A * | 10/1996 | Ferri | 73/861.48 |
| 6,298,718 B1 * | 10/2001 | Wang | 73/114.01 |
| 6,401,457 B1 | 6/2002 | Wang et al. | |
| 6,539,714 B1 | 4/2003 | Wang | |
| 6,698,203 B2 | 3/2004 | Wang | |
| 6,805,095 B2 | 10/2004 | Sun et al. | |
| 6,990,814 B2 | 1/2006 | Boley et al. | |
| 7,089,738 B1 * | 8/2006 | Boewe et al. | 701/108 |
| 7,107,978 B2 * | 9/2006 | Itoyama | 73/114.74 |
| 7,143,753 B2 | 12/2006 | Tanaka et al. | |
| 7,159,453 B2 * | 1/2007 | Muto et al. | 73/114.34 |
| 7,200,524 B2 | 4/2007 | Kang et al. | |
| 7,260,933 B2 * | 8/2007 | Barba et al. | 701/102 |
| 7,318,342 B2 | 1/2008 | Boehm et al. | |
| 7,346,469 B2 | 3/2008 | Taware et al. | |
| 7,363,183 B2 * | 4/2008 | Gelmetti et al. | 702/100 |
| 7,363,920 B2 * | 4/2008 | Ueno | 701/104 |
| 7,367,188 B2 * | 5/2008 | Barbe et al. | 701/108 |
| 7,398,149 B2 * | 7/2008 | Ueno et al. | 701/108 |
| 7,426,922 B2 * | 9/2008 | Shimo et al. | 123/568.12 |
| 7,457,701 B2 | 11/2008 | Tanaka | |
| 7,512,479 B1 | 3/2009 | Wang | |
| 7,861,580 B2 * | 1/2011 | Sujan et al. | 73/114.77 |
| 8,209,979 B2 * | 7/2012 | Wang et al. | 60/605.1 |
| 2006/0032224 A1 | 2/2006 | Akins et al. | |
| 2007/0255483 A1 | 11/2007 | Tanaka | |
| 2008/0022677 A1 | 1/2008 | Barbe et al. | |
| 2008/0022972 A1 * | 1/2008 | Shimo et al. | 123/445 |
| 2008/0033627 A1 * | 2/2008 | Tanaka | 701/102 |
| 2008/0270011 A1 * | 10/2008 | Takahashi et al. | 701/114 |
| 2009/0090106 A1 | 4/2009 | Muller | |
| 2009/0094009 A1 | 4/2009 | Muller | |
| 2009/0211248 A1 | 8/2009 | Andreae et al. | |
| 2009/0314082 A1 * | 12/2009 | Sujan et al. | 123/559.1 |
| 2010/0101226 A1 | 4/2010 | Shutty et al. | |
| 2010/0292907 A1 * | 11/2010 | Sarlashkar et al. | 701/102 |
| 2013/0080024 A1 * | 3/2013 | Chi et al. | 701/102 |
| 2013/0080025 A1 * | 3/2013 | Chi et al. | 701/102 |
| 2013/0131955 A1 * | 5/2013 | Vyas et al. | 701/102 |

OTHER PUBLICATIONS

International Search Report and Written Opinion, PCT/US11/39152, Cummins Inc., International Searching Authority/US, Oct. 24, 2011.

Renberg, 1D engine simulation of a turbocharged SI engine with CFD computation on components, Licentiate Thesis [online], 53 pages, Department of Machine Design Royal Institute of Technology, Stockholm, Sep. 2008.

* cited by examiner

FRESH AIR FLOW ESTIMATION

CROSS-REFERENCE TO RELATED APPLICATIONS

This present application claims the benefit of U.S. Provisional Patent Application No. 61/351,005 filed Jun. 3, 2010, which is incorporated herein by reference in its entirety and for all purposes.

BACKGROUND

The present application relates to estimating fresh air flow in an engine, and more particularly, but not exclusively to compressor based models for estimating fresh air flow in an engine.

Present approaches to estimating fresh air flow in an engine suffer from a variety of drawbacks, limitations, disadvantages and problems including those respecting special system conditions such as EGR deactivation, and others. There is a need for the unique and inventive apparatuses, systems and methods for estimating fresh air flow in an engine disclosed herein.

SUMMARY

One embodiment of the present invention is a unique estimation of fresh air flow in an engine. Other embodiments include apparatuses, systems, devices, hardware, methods, and combinations for estimating fresh air flow in an engine. Further embodiments, forms, features, aspects, benefits, and advantages of the present application shall become apparent from the description and figures provided herewith.

DETAILED DESCRIPTION OF EXEMPLARY EMBODIMENTS

Figure 1:
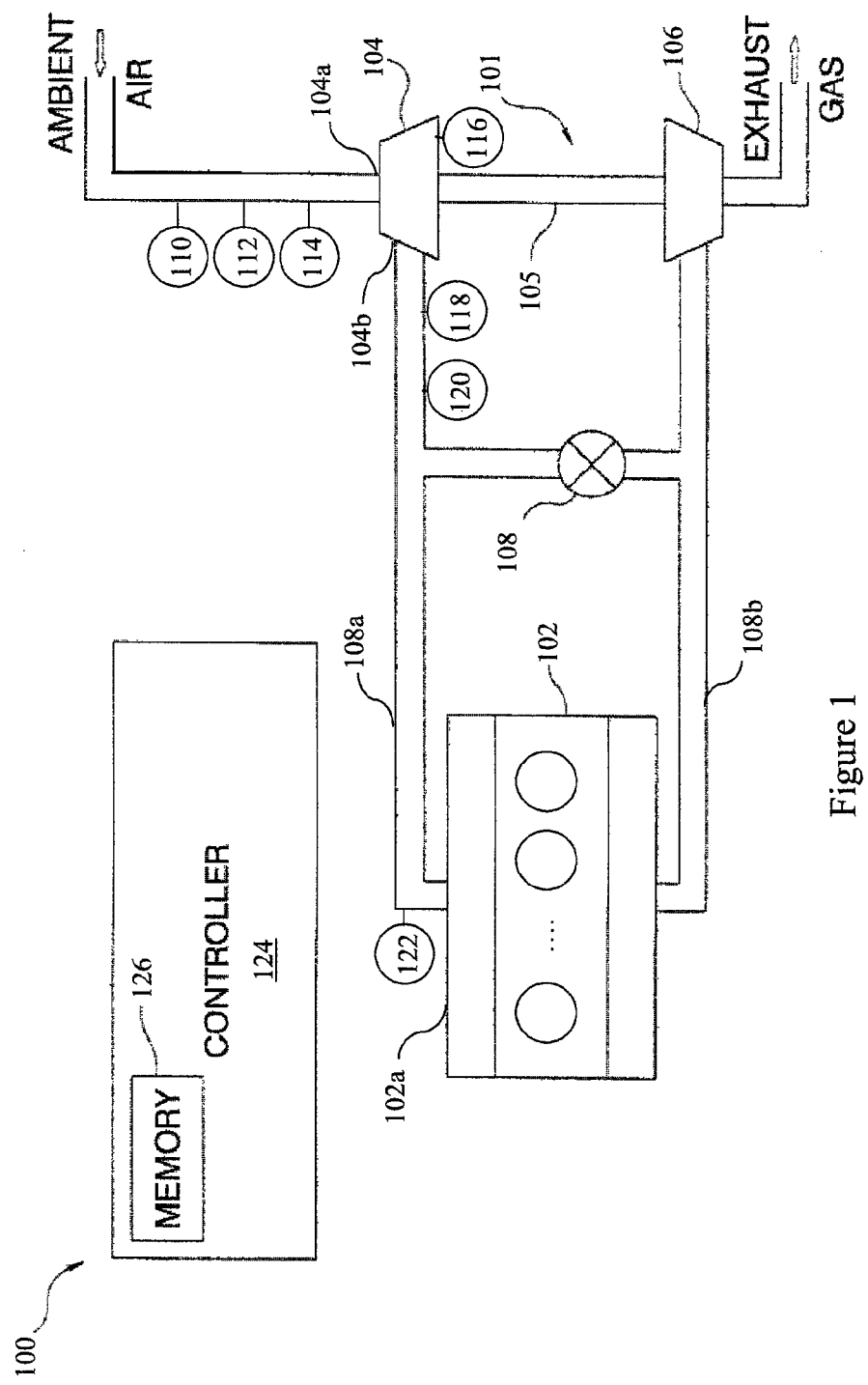
FIG. 1 is an exemplary system diagram for determining fresh air flow in an engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present application includes a method of estimating fresh air flow for an internal combustion engine using a regression model for a compressor. Another embodiment includes a system involving physics based compressor map and model equations to estimate fresh air flow. In further embodiments, an estimate of fresh air flow is provided which may be used to correct mass air flow (MAF) sensor drift. In other embodiments, a fresh air flow value is provided for use in MAF sensor rationality checks and/or diagnostic checks. An embodiment may include a fresh air flow estimation solved in real time through an engine control management processor.

FIG. 1 illustrates details of an engine system 100. A turbocharger 101 includes a compressor 104 and a turbine 106. Compressor 104 is mechanically coupled to turbine 106 via drive coupling 105. Coupling 105 may be in the form of a rotatable drive shaft, pulley and belt arrangement, intermeshing gears, a combination of these, and/or such other arrangement to drive compressor 104 with turbine 106 as would occur to those skilled in the art. In still other embodiments, multistage compressors, multistage turbines, or a combination of these are envisioned. An exhaust gas recirculation (EGR) system 108 is shown disposed between an intake line 108a and an exhaust line 108b.

In one form, engine 102 is of a conventional, four-stroke, reciprocating piston variety. However, in lieu of a reciprocating piston-based engine, a rotor-based engine may be utilized in an alternative embodiment of the present application. Also, in other embodiments, an engine with a different number of operating cycles, such as a two-cycle sequence, may be utilized.

Engine system 100 includes a controller 124 that is generally operable to control and manage the overall operation of engine 102. Controller 124 includes memory 126 as well as a number of inputs and outputs (not shown) for interfacing with various sensors and actuator in the system 100. The exemplary system 100 includes a mass airflow (MAF) sensor 110, a compressor inlet temperature sensor 112, and a compressor inlet pressure sensor 114 at a position upstream of the inlet portion 104a of compressor 104. The exemplary system 100 further includes a compressor outlet temperature sensor 118 and a compressor outlet pressure sensor 120 positioned along an outlet portion 104b of compressor 104. The system 100 includes a compressor rotational speed sensor 116 that may be any type of speed sensor known in the art, e.g. a variable reluctance or a hall effect sensor. Certain embodiments of the system 100 include a charge pressure sensor 122 at a position downstream of the compressor 104 and a mixing point of an EGR flow path 108, for example at intake manifold 108a. The illustrated sensors are exemplary and non-limiting. Specific embodiments of the system 100 may have some or all of the presented sensors, and/or include additional sensors not shown in FIG. 1.

In certain embodiments, the system 100 further includes a controller 124 structured to perform certain operations to determine compressor inlet flow (or fresh air flow). In certain embodiments, the controller 124 forms a portion of a processing subsystem including one or more computing devices having memory 126, processing, and communication hardware. The controller 124 may be a single device or a distributed device, and the functions of the controller may be performed by hardware or software. Controller 124 may be provided in the form of one or more components based on digital circuitry, analog circuitry, or a combination of these; and/or may be based on one or more central processing units (CPUs), arithmetic logic units (ALUs), or the like; of a RISC, CISC, or any other variety. For a multiple component form, such components may be integrated in a single unit or remotely located relative to one another. Controller 124, in one embodiment, may be a known control unit sometimes referred to as an electronic or engine control module (ECM), electronic or engine control unit (ECU) or the like.

Controller 124 may execute operating logic to perform one or more control routines. Such logic may be in the form of software or firmware programming instructions, dedicated hardware (such as a synchronous state machine or asynchronous machine), one or more signals encoded to provide controller instructions and/or direct controller operation, or a combination of these, to name just a few examples.

In certain embodiments, the controller 124 includes one or more modules structured to functionally execute the operations of the controller 124. In certain embodiments, the controller 124 includes an operating conditions module that interprets a number of compressor operating parameters, a compressor flow module that determines a compressor inlet flow in response to the compressor operating parameters, and a fresh air flow module that provides a fresh air flow value in response to the compressor inlet flow. The description herein including modules emphasizes the structural independence of the aspects of the controller 124, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 2.

The MAF sensor 110 may be used to determine a fresh air flow into an engine. The MAF measurement may be utilized to determine one or more of the charge flow (fresh air flow combined with EGR flow) into the engine or the EGR flow in the system 100. Any one or more of the EGR flow 108 and the charge flow may be a virtual sensor, or a value calculated according to models and correlations from known parameters in the system 100. An engine control unit (ECU) uses information such as the fresh air flow, the EGR flow, and/or the charge flow to control other engine operating parameters such as fuel injection rates, fuel timing values, EGR fraction targets, and other parameters.

MAF sensors are known to drift or otherwise be inaccurate over time due to sensor aging, sensor contamination, or upstream plumbing changes. Known techniques to correct for the drift of a MAF sensor over time include shutting off the EGR flow such that all of the engine flow may be estimated readily from the engine speed and volumetric efficiency of the engine under the present operating conditions. However, shutting off the EGR flow is detrimental to emissions, and even a brief EGR shutoff event can dominate the NO emissions of an engine operating under stringent modern emissions regulations. Embodiments of the present invention do not require that the EGR flow be closed during operations to determine the fresh air flow or compressor inlet flow. Further, the embodiments of the present invention that determine the compressor inlet flow provide a flow value with reduced transient effects relative to known techniques that determine the gas flow rates at the engine.

Figure 2:
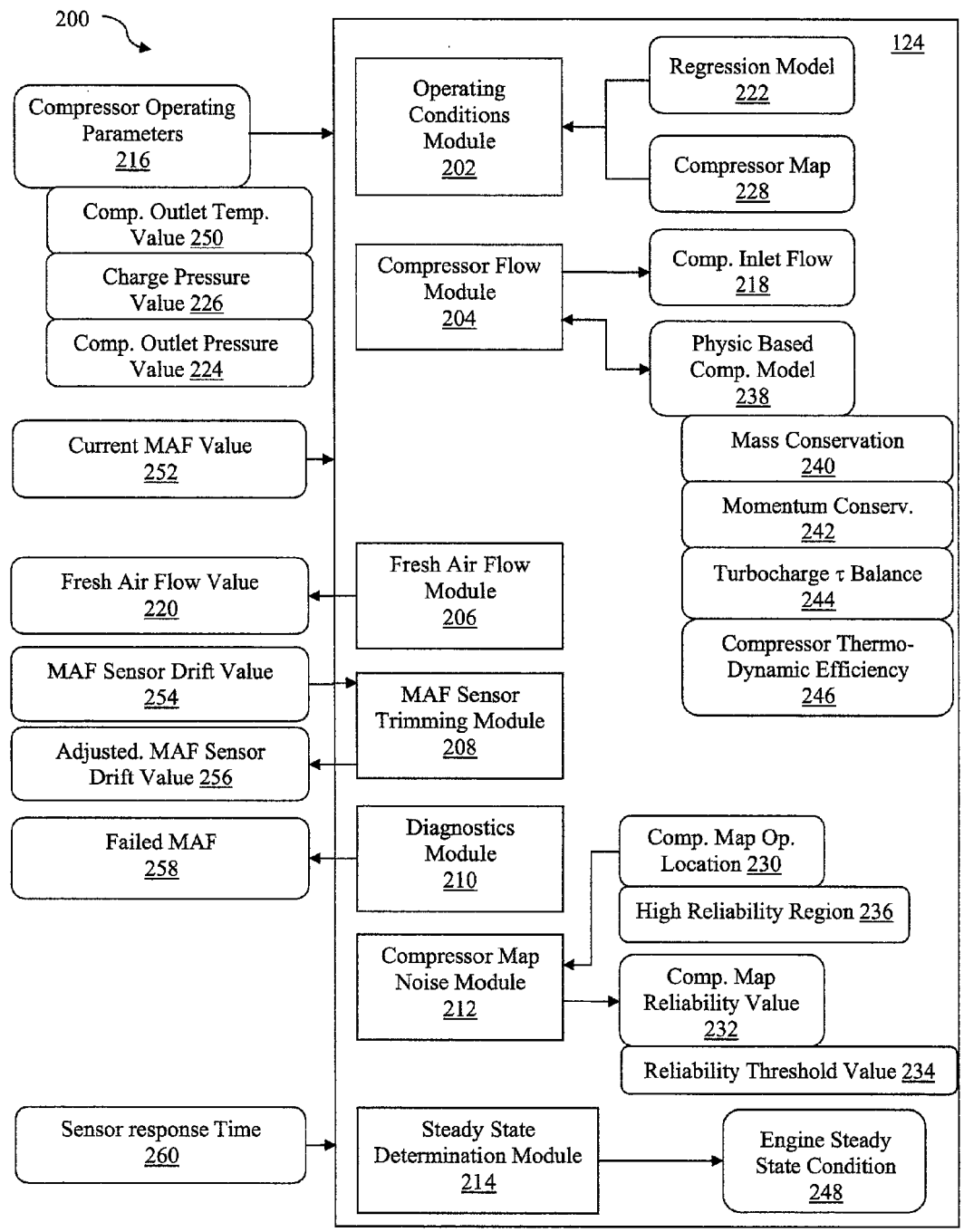
FIG. 2 is an exemplary control operation diagram for determining fresh air flow in an engine.

Referencing FIG. 2, an exemplary apparatus 200 includes a controller 124 with various components illustrated as representative modules, inputs, outputs, and intermediate data parameters. The arrangement of parameters as inputs, outputs, and intermediate data parameters are exemplary only, and any of the parameters may be present, not included in certain embodiments, stored on the controller 124, and/or communicated to the apparatus 200.

Module 202 is an operating conditions module structured to interpret compressor operating parameters 216. Exemplary compressor operating parameters 216 include a compressor outlet temperature value 250, a charge pressure value 226, a compressor outlet pressure value 224, and/or any other parameter that is sensed or determined in relation to the compressor. The illustrated parameters are exemplary and non-limiting.

Module 202 may be further structured to interpret a current MAF value 252. Module 204 is a compressor flow module structured to determine a compressor inlet flow 218 in response to compressor operating parameters 216 from module 202. Module 206 is a fresh air flow module structured to provide a fresh air flow value 220 in response to compressor inlet flow 218 from module 204. The fresh air flow value 220 may be estimated as the compressor inlet flow 218 or provided by any processing operations understood in the art in response to the compressor inlet flow 218. In certain embodiments, the fresh air flow value 220 is determined from filtering, de-bouncing, averaging, and/or providing for transient correction from the compressor inlet flow 218.

Module 208 is a mass air flow sensor trimming module structured to adjust a mass air flow sensor drift value 254 to an adjusted mass air flow sensor drift value 256 in response to current mass air flow value 252 from module 202 and fresh air flow value 220 from module 206. Module 210 is a diagnostics module structured to determine a mass air flow sensor is failed 258 in response to current mass air flow value 252 from module 202 and fresh air flow value 220 from module 206.

Module 202 may be further structured to interpret a regression model 222 and module 204 may be further structured to determine compressor inlet flow 218 in response to regression model 222 from module 202 and one of compressor outlet pressure value 224 and charge pressure value 226. An exemplary regression model 222 includes a best fit from test data for a model according to equation 1:

$$\dot{m}_{EST} = A_0 + \sum_{i=1}^{4} A_i y_i + \sum_{i=1}^{4} B_i y_i^2 + \sum_{i=2}^{4} B_{i+3} y_1 y_i + \sum_{i=3}^{4} B_{i+5} y_2 y_i + B_{10} y_3 y_4 \qquad \text{Eq. 1}$$

where $y_1 = \Omega$, $y_2 = \dfrac{P_{comp\_out}}{P_{comp\_in}}$, $y_3 = T_{out}$, $y_4 = T_{in}$.

The model of equation 1 is a quadratic regression model utilizing compressor inlet temperature, compressor outlet temperature, compressor inlet pressure, compressor outlet pressure and compressor speed ($\Omega$). Any type of fitting algorithm known in the art is applicable to equation 1, including in a least squares fit or other error reduction scheme for the fit constants. In certain embodiments, charge pressure may be substituted for compressor outlet pressure, as a regression model captures the pressure loss relationship between charge pressure and compressor outlet pressure. A sensor may be provided in an engine for charge pressure.

Figure 3:
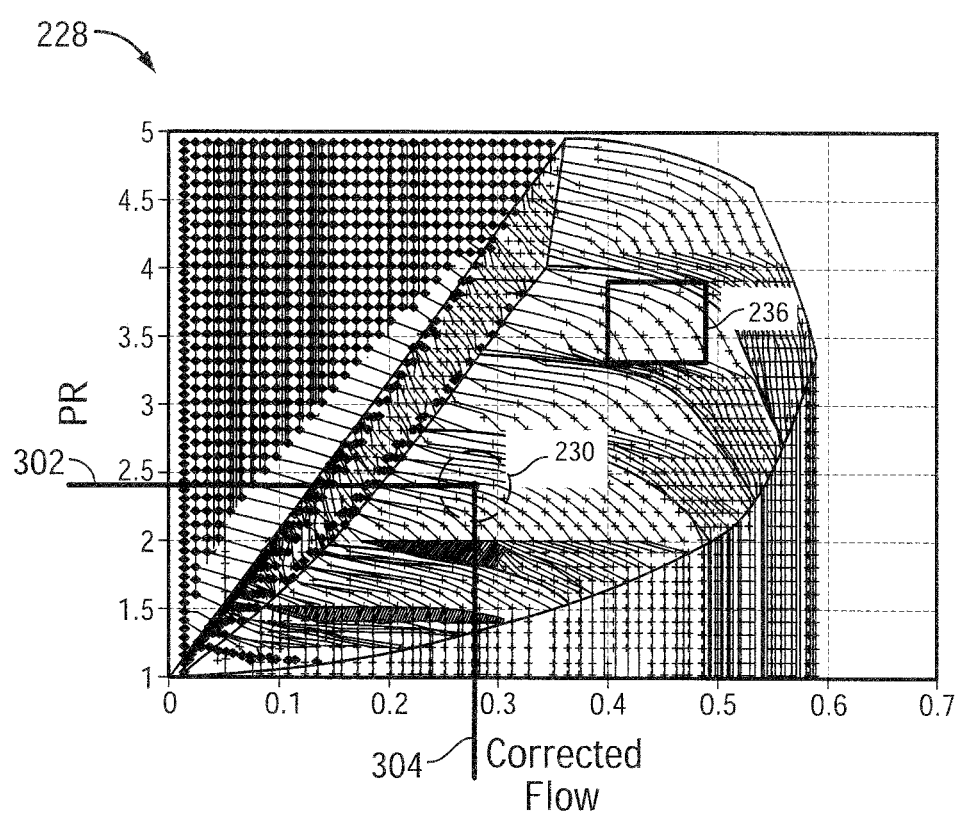
FIG. 3 is an exemplary compressor map having a high reliability region.

Module 202 may be additionally or alternatively structured to interpret a compressor map 228 and compressor outlet pressure value 224, where module 204 is further structured to determine compressor inlet flow 218 in response to compressor map 228 from module 202 and compressor outlet pressure value 224. Referencing FIG. 3, an exemplary compressor map 228 is illustrated. The compressor map 228 has an operating point 230 marked thereon, with a corresponding Y-axis value 302 that is a current pressure ratio, and a corresponding X-axis value 304 that is a current flow parameter value, which is typically a corrected flow value as understood in the art.

An exemplary module 204 determines the compressor inlet flow 218 in response to the compressor map 228 by determining a compressor corrected speed from a compressor speed $$\left(\text{e.g. as } N_{corrected} = \frac{N}{\sqrt{\frac{T}{T_{stp}}}}\right).$$

The exemplary module 204 further includes determining from the compressor map 228 an operating curve of compressor corrected flow values as a function of pressure ratio. The module 204 further determines the pressure ratio of the compressor, and accordingly the compressor corrected flow value from the operating curve of compressor corrected flow values as a function of pressure ratio. The module 204 then converts the compressor corrected flow value to the compressor inlet flow 218 using the compressor inlet temperature and compressor inlet pressure (e.g. as $$\text{Flow} = \frac{Flow_{corrected} * \frac{P}{P_{stp}}}{\sqrt{\frac{T}{T_{stp}}}}.$$

Any other operations of a module 204 to determine a compressor inlet flow 218 utilizing a compressor map 228 are contemplated herein.

The compressor map 228 may be determined empirically, provided by a manufacturer, and/or modified from previously determined maps. The compressor map 300, or relevant data samples therefrom, may be stored in tabular form or as any other data structure on the controller 124 or at a memory location in communication with the controller 124.

In certain embodiments, module 212 is a compressor map noise module that interprets a compressor map reliability value 232 in response to the operating location 230 on the compressor map 228. The module 204 is further structured to determine the compressor inlet flow 218 in response to compressor map reliability value 232 exceeding a reliability threshold value 234. In certain embodiments, the compressor map 228 is more reliable where the data contour lines are further spaced and/or progressing in a more parallel manner on the compressor map 228. The percentage error introduced by an offset of actual position on the map, or by an offset from a real data point on the map (and subsequent interpolation or extrapolation of data from the map) introduces less error in the portions of the map where data changes are less rapid. Additionally, the manufacturer or other creator of the map data may not have taken a more dense data set in the rapidly changing portions of the map, increasing the error in the closely spaced or curved portions of the map.

In certain embodiments, the compressor map 228 may includes a high reliability region 236 wherein the map 228 is known to be accurate. The map 228 may be accurate in the high reliability region 236 because the data from the map 228 has been tested and shown to be accurate in the region 236. Additionally or alternatively, an increased amount of data may have been taken in the high reliability region 236 relative to other portions of the map, to intentionally create a region of high accuracy or for any other reason. Accordingly, an exemplary module 212 determines the compressor map reliability value 232 in response to the operating location 230 being in the high reliability region 236, being in a region having spaced and/or parallel data contours, and/or according to any other reliability criteria understood in the art. In certain embodiments, where the module 212 determines the compressor map reliability value 232 does not exceed the reliability threshold value 234, the compressor inlet flow 218 is not determined, is not utilized, and/or is utilized with a reduced impact (e.g. the Adjusted MAF sensor drift value 256 is only partially adjusted in response to the lower confidence compressor inlet flow 218).

Module 204 may be further structured to determine compressor inlet flow 218 by operating a physics based compressor model 238. Physics based compressor model 238 may include a mass conservation consideration 240, a momentum conservation consideration 242, a turbocharger torque balance consideration 244, and a compressor thermodynamic efficiency consideration 246. Module 202 may also be structured to interpret compressor outlet pressure value 224 and compressor outlet temperature value 250 where module 204 is further structured to determine compressor inlet flow 218 in response to compressor outlet pressure value 224 and compressor outlet temperature value 250.

Module 202 may be further structured to interpret an engine steady state condition 248 where module 204 is further structured to determine compressor inlet flow 218 in response to engine steady state condition 248. In the physics based compressor model 250, the equations are significantly simplified during steady state operations, as some of the derivative based terms drop out of the model. In certain embodiments, the determination of the controller 124 includes a steady state determination module 214 that determines whether the engine is in a steady state condition 248 in response to a response time 260 of a sensor in system 200. For example, if a slowest response time of a sensor utilized in the model is an 8-second response time (e.g. for a thermistor), then a relatively steady engine speed and compressor speed for about 8-seconds may be utilized to determine that the steady state condition 248 is present.

Embodiments of the present application model air flow through the compressor based on physics principles including fluid flow equations for the gas law and conservation of mass and momentum. One embodiment solves for mass flow rate ($\dot{m}$) by using mass-momentum equations around a control volume of a turbocharger and measurements of pressure, temperature, and rotor speed.

Exemplary and non-limiting mass conservation considerations include:

$$\frac{d}{dt}\int_{CV} \rho dV + \int_{CS} \rho v_m dA = 0 \qquad \text{Eq. 2}$$

$$\dot{m} = \rho_1 v_1 A_1 = \rho_2 v_2 A_2 \qquad \text{Eq. 3}$$

$$\frac{P_1}{RT_1} v_1 A_1 = \frac{P_2}{RT_2} v_2 A_2 \qquad \text{Eq. 4}$$

$$v_2 = \frac{P_1}{P_2} \frac{A_1}{A_2} \frac{T_2}{T_1} v_1 \qquad \text{Eq. 5}$$

Mass flow rate (m) is the amount of mass flowing per unit of time. With a steady flow, the total rate of mass entering the system is equal to the total rate of mass exiting the system or $\dot{m}_1 = \dot{m}_2$. Since $\dot{m}$ may be expressed with density, area and velocity (Eq. 3) and $\rho$ is a function of pressure and temperature as expressed by the gas law $$\left(\rho = \frac{P}{RT}\right),$$

ρ may be replaced with pressure and temperature values as shown in Eq. 4. Solving for v gives air velocity (Eq. 5).

Exemplary momentum conservation considerations include:

$$\frac{d}{dt}\int_{CV} \bar{r} \times \rho \bar{v}_i d\mathcal{V} + \int_{CS} \bar{r} \times \rho \bar{v}_i \bar{v}_m dA = \sum_{CV} \bar{\tau}_i \quad \text{Eq. 6}$$

$$\rho_2 A_2 R v_2^2 = RA_2 P_2 + \tau_{compressor} \quad \text{Eq. 7}$$

Exemplary compressor and turbine work balance considerations include:

$$\tau_{comp} \cdot \omega = \frac{\dot{m} \cdot C_p \cdot T_{01}}{\eta_{comp}} \cdot \left(1 - \left(\frac{P_{02}}{P_{01}}\right)^{\frac{\gamma-1}{\gamma}}\right) \quad \text{Eq. 8}$$

$$\eta_{comp} = \frac{\left(\frac{P_{02}}{P_{01}}\right)^{\frac{\gamma-1}{\gamma}} - 1}{\frac{T_{02}}{T_{01}} - 1} \quad \text{Eq. 9}$$

$$T_{0i} = T_i + \frac{v_i^2}{2C_p} \quad \text{Eq. 10}$$

$$P_{0i} = P_i \left(\frac{T_{0i}}{T_i}\right)^{\frac{\gamma}{\gamma-1}} \quad \text{Eq. 11}$$

From the preceding equations and the steady state assumption, the following exemplary nine design equations are presented:

$$\dot{m} = \rho_1 v_1 A_1 = \rho_2 v_2 A_2; \quad \text{Eq. 12}$$

$$v_2 = \frac{P_1}{P_2} \frac{A_1}{A_2} \frac{T_2}{T_1} v_1; \quad \text{Eq. 13}$$

$$\rho_2 A_2 R v_2^2 = RA_2 P_2 + \tau_{comp}; \quad \text{Eq. 14}$$

$$\tau_{comp} \cdot \omega = \frac{\dot{m} \cdot C_p \cdot T_{01}}{\eta_{comp}} \cdot \left(1 - \left(\frac{P_{02}}{P_{01}}\right)^{\frac{\gamma-1}{\gamma}}\right); \quad \text{Eq. 15}$$

$$\eta_{comp} = \frac{\left(\frac{P_{02}}{P_{01}}\right)^{\frac{\gamma-1}{\gamma}} - 1}{\frac{T_{02}}{T_{01}} - 1}; \quad \text{Eq. 16}$$

$$T_{01} = T_1 + \frac{v_1^2}{2C_p}; \quad \text{Eq. 17}$$

$$P_{01} = P_1 \left(\frac{T_{01}}{T_1}\right)^{\frac{\gamma}{\gamma-1}}; \quad \text{Eq. 18}$$

$$T_{02} = T_2 + \frac{v_2^2}{2C_p}; \quad \text{Eq. 19}$$

$$P_{02} = P_2 \left(\frac{T_{02}}{T_2}\right)^{\frac{\gamma}{\gamma-1}}; \quad \text{Eq. 20}$$

In the exemplary design equations 12-20, the following parameters are unknown values:
$\dot{m}$=mass flow (the compressor inlet flow)
v=air velocity
τ=compressor torque
η=compressor efficiency
$P_{01}$, $P_{02}$=total pressure=static pressure+dynamic pressure
$T_{01}$, $T_{02}$=total temperature=static temperature+dynamic temperature The following parameters are measured values:
$P_1$, $P_2$=pressure of compressor inlet and outlet
$T_1$, $T_2$=temperature of compressor inlet and outlet
ω=compressor rotational speed The following parameters are geometric quantities which may be calibrations in the controller 124:
$A_1$, $A_2$=flow area at compressor inlet and outlet $$R = 286.9 \frac{J}{kgK} = \text{gas constant}$$

$$C_p = 1.005 \frac{kJ}{kgK} = \text{specific heat capacity of compressor gases}$$

γ=1.4=ratio of specific heats

One aspect of the present application is an apparatus with an operating conditions module structured to interpret a plurality of compressor operating parameters; a compressor flow module structured to determine a compressor inlet flow in response to the plurality of compressor operating parameters; and a fresh air flow module structured to provide a fresh air flow value in response to the compressor inlet flow. The operating conditions module may be further structured to interpret a current mass air flow value where the apparatus further includes a mass air flow sensor trimming module structured to adjust a mass air flow sensor drift value in response to the current mass air flow value and the fresh air flow value; interpret a current mass air flow value where the apparatus further includes a diagnostics module structured to determine a mass air flow sensor is failed in response to the current mass air flow value and the fresh air flow value; interpret a regression model of a compressor where the compressor flow module is further structured to determine the compressor inlet flow in response to the regression model of the compressor and one of a compressor outlet pressure value and a charge pressure value; interpret a compressor map and a compressor outlet pressure value where the compressor flow module is further structured to determine the compressor inlet flow in response to the compressor map and the compressor outlet pressure value.

A feature of this aspect may include a compressor map noise module structured to interpret a compressor map reliability value in response to an operating location on the compressor map where the compressor flow module is further structured to determine the compressor inlet flow in response to the compressor map reliability value exceeding a reliability threshold value. The compressor map may further include a high reliability region where the apparatus further includes a compressor map noise module structured to interpret whether a compressor is operating in the high reliability region and the compressor flow module is further structured to determine the compressor inlet flow in response to the compressor operating in the high reliability region.

Another feature of this aspect may include the compressor flow module being further structured to determine the compressor inlet flow by operating a physics based compressor model where the physics based compressor model may include a mass conservation consideration, a momentum conservation consideration, a turbocharger torque balance consideration, and a compressor thermodynamic efficiency consideration. Here the operating conditions module may be further structured to interpret a compressor outlet pressure value and a compressor outlet temperature value where the compressor flow module is further structured to determine the compressor inlet flow in response to the compressor outlet pressure value and the compressor outlet temperature value. The compressor flow module may be further structured to determine the compressor inlet flow utilizing a plurality of equations including:

$$\dot{m} = \rho_1 v_1 A_1 = \rho_2 v_2 A_2;$$

$$v_2 = \frac{P_1}{P_2}\frac{A_1}{A_2}\frac{T_2}{T_1}v_1;$$

$$\rho_2 A_2 R v_2^2 = RA_2 P_2 + \tau_{comp};$$

$$\tau_{comp} \cdot \omega = \frac{\dot{m} \cdot C_p \cdot T_{01}}{\eta_{comp}} \cdot \left(1 - \left(\frac{P_{02}}{P_{01}}\right)^{\frac{\gamma-1}{\gamma}}\right);$$

$$\eta_{comp} = \frac{\left(\frac{P_{02}}{P_{01}}\right)^{\frac{\gamma-1}{\gamma}} - 1}{\frac{T_{02}}{T_{01}} - 1};$$

$$T_{01} = T_1 + \frac{v_1^2}{2C_p};$$

$$P_{01} = P_1 \left(\frac{T_{01}}{T_1}\right)^{\frac{\gamma}{\gamma-1}};$$

$$T_{02} = T_2 + \frac{v_2^2}{2C_p};$$

$$P_{02} = P_2 \left(\frac{T_{02}}{T_2}\right)^{\frac{\gamma}{\gamma-1}};$$

where $\dot{m}$ comprises a mass flow rate, $\rho_1$, $\rho_2$ comprise a first and second density value, $v_1$, $v_2$ comprise a first and second velocity value, $A_1$, $A_2$ comprise a first and second area value, $P_1$ comprises a compressor inlet pressure value, $P_2$ comprises the compressor outlet pressure value, $T_1$ comprises a compressor inlet temperature value, $T_2$ comprises the compressor outlet temperature value, R comprises a gas constant, $\tau_{comp}$ comprises a compressor torque value, $\omega$ comprises a compressor rotational speed, $C_p$ comprises a specific heat capacity, $\eta_{comp}$ comprises a compressor efficiency value, and where $\gamma$ comprises a specific heat ratio.

Another aspect of the present application is a method including interpreting a plurality of compressor operating parameters; determining a compressor inlet flow in response to the plurality of compressor operating parameters; and providing a fresh air flow value in response to the compressor inlet flow. Further features may include interpreting a current mass air flow value and adjusting a mass air flow sensor drift value in response to the current mass air flow value and the fresh air flow value or interpreting a current mass air flow value and determining a mass air flow sensor status in response to the current mass air flow value and the fresh air flow value. Another feature of the present aspect may include interpreting a regression model of a compressor and determining the compressor inlet flow in response to the regression model of the compressor and one of a compressor outlet pressure value and a charge pressure value.

Still other features may include providing a compressor outlet pressure value; interpreting a compressor map and the compressor outlet pressure value; and determining the compressor inlet flow in response to the compressor map and the compressor outlet pressure value; interpreting a compressor map reliability value in response to an operating location on the compressor map and determining the compressor inlet flow in response to the compressor map reliability value exceeding a reliability threshold value; where the compressor map further includes a high reliability region and the aspect further including interpreting whether a compressor is operating in the high reliability region and determining the compressor inlet flow in response to the compressor operating in the high reliability region.

Yet another feature may include determining the compressor inlet flow comprises operating a physics based compressor model where the operating the physics based compressor model includes considering a mass conservation term, a momentum conservation term, a turbocharger torque balance term, and a compressor thermodynamic efficiency term.

The aspect may further include interpreting an engine steady state condition and determining the compressor inlet flow in response to the engine steady state condition or interpreting a response time of a sensor, and interpreting the engine steady state condition in response to the response time of the sensor.

Yet another aspect of the present application may include a system having an engine; a turbocharger having a compressor and a turbine; and a controller with an operating conditions module structured to interpret a plurality of compressor operating parameters; a compressor flow module structured to determine a compressor inlet flow in response to the plurality of compressor operating parameters; and a fresh air flow module structure to provide a fresh air flow value in response to the compressor inlet flow. The operating conditions module may be further structured to interpret a current mass air flow value where the controller further includes a mass air flow sensor trimming module structured to adjust a mass air flow sensor drift value in response to the current mass air flow value and the fresh air flow value.

A feature of this aspect may include a mass air flow sensor operationally coupled to air flow at an inlet of the compressor with the mass air flow sensor providing a current mass air flow value and where the operating conditions module is further structured to interpret the current mass air flow value and the controller further including a diagnostics module structured to determine the mass air flow sensor is failed in response to the current mass air flow value and the fresh air flow value.

Further features may include the operating conditions module being further structured to interpret a regression model of the compressor where the compressor flow module is further structured to determine the compressor inlet flow in response to the regression model of the compressor and one of a compressor outlet pressure value and a charge pressure value, and a compressor outlet pressure sensor providing a compressor outlet pressure value where the operating conditions module is further structured to interpret a compressor map and the compressor outlet pressure value and the compressor flow module is further structured to determine the compressor inlet flow in response to the compressor map and the compressor outlet pressure value.

Yet another feature may be the controller further including a compressor map noise module structured to interpret a compressor map reliability value in response to a current operating location on the compressor map where the compressor flow module is further structured to determine the compressor inlet flow in response to the compressor map reliability value exceeding a reliability threshold value or the compressor map further including a high reliability region where the controller further includes a compressor map noise module structured to interpret whether the compressor is operating in the high reliability region and the compressor flow module is further structured to determine the compressor inlet flow in response to the compressor operating in the high reliability region.

Still another feature of the present aspect may include the compressor flow module being further structured to determine the compressor inlet flow by operating a physics based compressor model where the physics based compressor model includes a mass conservation consideration, a momentum conservation consideration, a turbocharger torque balance consideration, and a compressor thermodynamic efficiency consideration. A compressor outlet pressure sensor may provide a compressor outlet pressure value and a compressor outlet temperature sensor may provide a compressor outlet temperature value where the operating conditions module is further structured to interpret the compressor outlet pressure value and the compressor outlet temperature value and the compressor flow module is further structured to determine the compressor inlet flow in response to the compressor outlet pressure value and the compressor outlet temperature value.

Yet another feature may have the operating conditions module be further structured to interpret an engine steady state condition where the compressor flow module is further structured to determine the compressor inlet flow in response to the engine steady state condition or the controller further includes a steady state determination module structured to determine whether the engine is in a steady state condition in response to a response time of a sensor in the system.

Another aspect of the present application may include a system having an engine; a turbocharger having a compressor and a turbine; and a means for determining a fresh air flow value for the engine from a plurality of compressor operating parameters.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein are desired to be protected.

What is claimed is:

1. A method comprising:
   interpreting a plurality of compressor operating parameters of a compressor of a turbocharger during operation of an internal combustion engine system;
   determining a compressor inlet flow value in response to the plurality of compressor operating parameters;
   determining an estimate of a fresh air flow value to the internal combustion engine from the compressor inlet flow value; and
   correcting a drift value of a mass air flow sensor upstream of the compressor in response to a current mass air flow value measured by the mass air flow sensor and the estimate of the fresh air flow value.

2. The method of claim 1, further including adjusting a mass air flow sensor drift value in response to the current mass air flow value and the estimate of the fresh air flow value.

3. The method of claim 1, further including determining a mass air flow sensor status in response to the current mass air flow value and the estimate of the fresh air flow value.

4. The method of claim 1, further including interpreting a regression model of a compressor and determining the compressor inlet flow value in response to the regression model of the compressor and one of a compressor outlet pressure value and a charge pressure value.

5. The method of claim 1, further including:
   providing a compressor outlet pressure value;
   interpreting a compressor map and the compressor outlet pressure value; and
   determining the compressor inlet flow value in response to the compressor map and the compressor outlet pressure value.

6. The method of claim 5, further including interpreting a compressor map reliability value in response to an operating location on the compressor map and determining the compressor inlet flow value in response to the compressor map reliability value exceeding a reliability threshold value.

7. The method of claim 5, wherein the compressor map further includes a high reliability region, the method further including interpreting whether a compressor is operating in the high reliability region and determining the compressor inlet flow value in response to the compressor operating in the high reliability region.

8. The method of claim 1, wherein the determining the compressor inlet flow value comprises operating a physics based compressor model.

9. The method of claim 8, wherein the operating the physics based compressor model includes considering a mass conservation term, a momentum conservation term, a turbocharger torque balance term, and a compressor thermodynamic efficiency term.

10. The method of claim 8, further including interpreting an engine steady state condition and determining the compressor inlet flow value in response to the engine steady state condition.

11. The method of claim 10, further comprising interpreting a response time of a sensor, and interpreting the engine steady state condition in response to the response time of the sensor.

12. An apparatus comprising:
   a controller with a memory and a plurality of modules configured to execute operations of the controller, wherein the controller is configured to receive a plurality of operating parameters from an engine system including a turbocharger with a compressor, the plurality of modules including:
   an operating conditions module structured to interpret a plurality of compressor operating parameters and a current mass air flow value from a mass air flow sensor upstream of the compressor during operation of the engine system;

a compressor flow module structured to determine a compressor inlet flow value to the compressor in response to the plurality of compressor operating parameters; and a fresh air flow module structured to determine an estimate of a fresh air flow value to the engine system from the compressor inlet flow value, wherein the controller is configured to correct a drift value of the mass air flow sensor in response to the current mass air flow value and the estimate of the fresh air flow value.

13. The apparatus of claim 12, wherein the controller further comprises a mass air flow sensor trimming module structured to adjust a mass air flow sensor drift value in response to the current mass air flow value and the estimate of the fresh air flow value.

14. The apparatus of claim 12, wherein the controller further comprises a diagnostics module structured to determine a mass air flow sensor is failed in response to the current mass air flow value and the estimate of the fresh air flow value.

15. The apparatus of claim 12, wherein the operating conditions module is further structured to interpret a regression model of the compressor and wherein the compressor flow module is further structured to determine the compressor inlet flow value in response to the regression model of the compressor and one of a compressor outlet pressure value and a charge pressure value.

16. The apparatus of claim 12, wherein the operating conditions module is further structured to interpret a compressor map and a compressor outlet pressure value, and wherein the compressor flow module is further structured to determine the compressor inlet flow value in response to the compressor map and the compressor outlet pressure value.

17. The apparatus of claim 16, wherein the controller comprises a compressor map noise module structured to interpret a compressor map reliability value in response to an operating location on the compressor map, and wherein the compressor flow module is further structured to determine the compressor inlet flow value in response to the compressor map reliability value exceeding a reliability threshold value.

18. The apparatus of claim 16, wherein the compressor map further includes a high reliability region, the controller further comprises a compressor map noise module structured to interpret whether a compressor is operating in the high reliability region, and wherein the compressor flow module is further structured to determine the compressor inlet flow value in response to the compressor operating in the high reliability region.

19. The apparatus of claim 12, wherein the compressor flow module is further structured to determine the compressor inlet flow value by operating a physics based compressor model.

20. The apparatus of claim 19, wherein the physics based compressor model includes a mass conservation consideration, a momentum conservation consideration, a turbocharger torque balance consideration, and a compressor thermodynamic efficiency consideration.

21. The apparatus of claim 20, wherein the operating conditions module is further structured to interpret a compressor outlet pressure value and a compressor outlet temperature value, and wherein the compressor flow module is further structured to determine the compressor inlet flow value in response to the compressor outlet pressure value and the compressor outlet temperature value.

22. The apparatus of claim 21, wherein the compressor flow module is further structured to determine the compressor inlet flow value utilizing a plurality of equations comprising:

$$\dot{m} = \rho_1 v_1 A_1 = \rho_2 v_2 A_2;$$

$$v_2 = \frac{P_1}{P_2}\frac{A_1}{A_2}\frac{T_2}{T_1}v_1;$$

$$\rho_2 A_2 R v_2^2 = R A_2 P_2 + \tau_{comp};$$

$$\tau_{comp} \cdot \omega = \frac{\dot{m} \cdot C_p \cdot T_{01}}{\eta_{comp}} \cdot \left(1 - \left(\frac{P_{02}}{P_{01}}\right)^{\frac{\gamma-1}{\gamma}}\right);$$

$$\eta_{comp} = \frac{\left(\frac{P_{02}}{P_{01}}\right)^{\frac{\gamma-1}{\gamma}} - 1}{\frac{T_{02}}{T_{01}} - 1};$$

$$T_{01} = T_1 + \frac{v_1^2}{2C_p};$$

$$P_{01} = P_1\left(\frac{T_{01}}{T_1}\right)^{\frac{\gamma}{\gamma-1}};$$

$$T_{02} = T_2 + \frac{v_2^2}{2C_p};$$

$$P_{02} = P_2\left(\frac{T_{02}}{T_2}\right)^{\frac{\gamma}{\gamma-1}};$$

wherein $\dot{m}$ comprises the compressor inlet flow value, $\rho_1$ $\rho_2$ comprise a first and second density value, $v_1$ and $v_2$ comprise inlet and outlet velocity values, $A_1$ and $A_2$ comprise inlet and outlet area values, $P_1$ and $P_{01}$ comprise the normal and stagnation compressor inlet pressure values, $P_2$ and $P_{02}$ comprise the normal and stagnation compressor outlet pressure values, $T_1$ and $T_{01}$ comprise the normal and stagnation compressor inlet temperature values, $T_2$ and $T_{02}$ comprise the normal and stagnation compressor outlet temperature values, R comprises a gas constant, $\tau_{comp}$ comprises a compressor torque value, $\omega$ comprises a compressor rotational speed, $C_p$ comprises a specific heat capacity of the compressor gases, $\eta_{comp}$ comprises a compressor efficiency value, and wherein $\gamma$ comprises a specific heat ratio.

23. A system comprising:

an engine;

a turbocharger having a compressor and a turbine;

a mass air flow sensor upstream of the compressor operable to measure a current mass air flow value;

a controller comprising:

an operating conditions module structured to interpret a plurality of compressor operating parameters and the current mass air flow value;

a compressor flow module structured to determine a compressor inlet flow value in response to the plurality of compressor operating parameters; and a fresh air flow module structure to determine an estimate of a fresh air flow value from the compressor inlet flow value, wherein the controller is configured to correct a drift value of the mass air flow sensor in response to the current mass air flow value and the estimate of the fresh air flow value.

24. The system of claim 23, wherein the controller further comprises a mass air flow sensor trimming module structured to adjust a mass air flow sensor drift value in response to the current mass air flow value and the estimate of the fresh air flow value.

25. The system of claim 23, wherein the controller further comprises a diagnostics module structured to determine the mass air flow sensor is failed in response to the current mass air flow value and the estimate of the fresh air flow value.

26. The system of claim 23, wherein the operating conditions module is further structured to interpret a regression model of the compressor and wherein the compressor flow module is further structured to determine the compressor inlet flow value in response to the regression model of the compressor and one of a compressor outlet pressure value and a charge pressure value.

27. The system of claim 23, further including a compressor outlet pressure sensor providing a compressor outlet pressure value, wherein the operating conditions module is further structured to interpret a compressor map and the compressor outlet pressure value, and wherein the compressor flow module is further structured to determine the compressor inlet flow value in response to the compressor map and the compressor outlet pressure value.

28. The system of claim 27, wherein the controller further comprises a compressor map noise module structured to interpret a compressor map reliability value in response to a current operating location on the compressor map, and wherein the compressor flow module is further structured to determine the compressor inlet flow value in response to the compressor map reliability value exceeding a reliability threshold value.

29. The system of claim 27, wherein the compressor map further includes a high reliability region, wherein the controller further comprises a compressor map noise module structured to interpret whether the compressor is operating in the high reliability region, and wherein the compressor flow module is further structured to determine the compressor inlet flow value in response to the compressor operating in the high reliability region.

30. The system of claim 23, wherein the compressor flow module is further structured to determine the compressor inlet flow value by operating a physics based compressor model.

31. The system of claim 30, wherein the physics based compressor model includes a mass conservation consideration, a momentum conservation consideration, a turbocharger torque balance consideration, and a compressor thermodynamic efficiency consideration.

32. The system of claim 31, further comprising a compressor outlet pressure sensor providing a compressor outlet pressure value and a compressor outlet temperature sensor providing a compressor outlet temperature value, wherein the operating conditions module is further structured to interpret the compressor outlet pressure value and the compressor outlet temperature value, and wherein the compressor flow module is further structured to determine the compressor inlet flow value in response to the compressor outlet pressure value and the compressor outlet temperature value.

33. The system of claim 30, wherein the operating conditions module is further structured to interpret an engine steady state condition and wherein the compressor flow module is further structured to determine the compressor inlet flow value in response to the engine steady state condition.

34. The system of claim 33, wherein the controller further comprises a steady state determination module structured to determine whether the engine is in a steady state condition in response to a response time of a sensor in the system.

* * * * *